(12) United States Patent
Dant

(10) Patent No.: US 10,360,416 B1
(45) Date of Patent: Jul. 23, 2019

(54) CARD READER ANTI-THEFT DEVICES AND METHODS

(71) Applicant: CITIBANK, N.A., New York, NY (US)

(72) Inventor: Jeffrey W. Dant, Long Valley, NJ (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 15/882,451

(22) Filed: Jan. 29, 2018

(51) Int. Cl.
- G06K 7/06 (2006.01)
- G06K 7/00 (2006.01)
- G06F 21/60 (2013.01)

(52) U.S. Cl.
CPC .......... *G06K 7/0091* (2013.01); *G06F 21/60* (2013.01); *G06K 7/0056* (2013.01)

(58) Field of Classification Search
CPC .... G06K 7/087; G06K 13/085; G06K 9/0002; G06K 9/00053; G06K 9/00087; G07F 19/2055; G07F 19/209; G04R 60/12; G06F 21/31; G06F 21/32
USPC ......................................................... 235/441
See application file for complete search history.

(56) References Cited

U.S. PATENT DOCUMENTS

| | | | |
|---|---|---|---|
| 8,640,947 B1* | 2/2014 | Lewis | G07F 19/209 235/379 |
| 9,767,422 B2* | 9/2017 | Ray | G07F 19/2055 |
| 2002/0071346 A1* | 6/2002 | Paratte | G04G 21/04 368/10 |
| 2014/0158768 A1* | 6/2014 | Ray | H04K 3/825 235/449 |
| 2014/0372305 A1* | 12/2014 | Ray | G07F 19/2055 705/44 |
| 2016/0125207 A1* | 5/2016 | Aiyoshi | G06K 7/0004 235/440 |
| 2017/0293793 A1* | 10/2017 | Lavin | G06F 21/31 |
| 2017/0316288 A1* | 11/2017 | Aiyoshi | G06K 13/085 |

* cited by examiner

*Primary Examiner* — Thien M Le
(74) *Attorney, Agent, or Firm* — Johnson, Marcou & Isaacs, LLC; John M. Harrington, Esq.

(57) ABSTRACT

A detection device and method includes a tongue component having a distal end portion that is insertable a predetermined distance into a card entry slot of a card reader and also having an electrical contact disposed on the distal end portion of the tongue component. A signal component coupled to the electrical contact is activated in response to receiving an electric current by the signal component via the electrical contact disposed on said distal end portion of the tongue component when the distal end portion of the tongue component is inserted the predetermined distance into the card entry slot. An overlay component having portions defining a surface topography corresponding to a surface topography of portions of a bezel area of the card entry slot supports a proximal end portion of the tongue component.

19 Claims, 5 Drawing Sheets

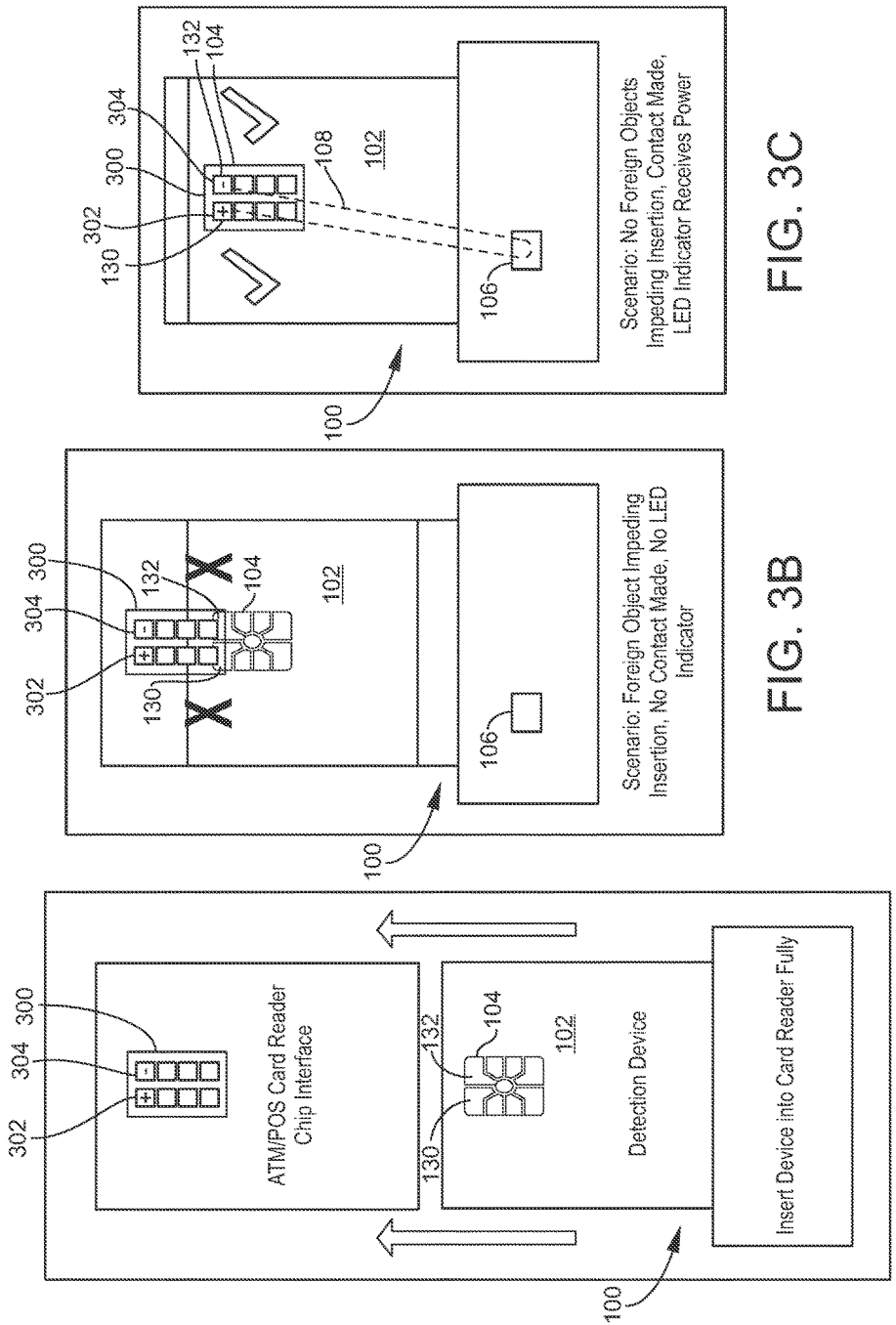

CARD READER ANTI-THEFT DEVICES AND METHODS

FIELD OF THE INVENTION

The present invention relates generally to the field of chip-equipped cards and more particularly to anti-theft devices and methods for card reader devices.

BACKGROUND

While card skimming, such as automated teller machine (ATM) magnetic stripe card skimming, has been somewhat curtailed with the issuance of chip-equipped cards (also known as integrated circuit cards or ICCs) by most major card issuers, criminals have responded with new devices, typically referred to as shimming devices. Such shimming devices are designed to steal information from the chip of a chip-equipped card that is the same as the static information stored a magnetic stripe of a magnetic stripe cards. A chip itself is a dynamic device, and it is not possible for criminals to steal the chip dynamic per se. However, the same static information that is stored on a magnetic stripe is also stored on the chip of a chip-equipped card, and it is possible for criminals to steal the static information that is stored on the chip and use that information to clone magnetic stripe cards.

Shimming devices to steal information from a chip may be quite small. For example, a shimming device may be a paper-thin, card-sized shim containing an embedded microchip and flash storage, which a criminal can secretly insert into the card slot itself, where it remains hidden while intercepting chip card data. Such small size makes it much easier for criminals to install such devices, for example, in chip card readers of ATMs and point-of-sale (POS) terminals, as well as access control chip card readers to access locked premises, such as ATM vestibules or lobbies. Further, such shimming devices are more difficult to detect than traditional skimming technology devices.

Thus, while criminals continue to attempt to steal card data, for example, by placing overlays on exterior features of chip card readers, such criminals may now attempt chip-equipped card data theft by installing shimming devices inside chip card readers or chip card reader insert slots. There is a current need for inspection devices and methods that can detect the presence of chip shimmers, as well as external card skimmers, deep insert skimmers, throat skimmers, and card traps, and thus avoid exposing a cardholder's account information to potential theft when the cardholder uses his or her card at a card reader of a terminal, such as an ATM or POS terminal, or at an access control card reader.

SUMMARY OF THE INVENTION

Embodiments of the invention are directed to technological solutions that provide, for example, a device that may include, for example, a tongue component having a distal end portion insertable a predetermined distance into a card entry slot of a card reader; the tongue component having an electrical contact disposed on the distal end portion of the tongue component; and a signal component coupled to said electrical contact activated in response to receiving an electric current by said signal component via said electrical contact disposed on the distal end portion of the tongue component when the distal end portion of the tongue component is inserted the predetermined distance into said card entry slot.

In embodiments of the invention, the tongue component having the distal end portion may be insertable the predetermined distance into the card entry slot of a chip card reader. In other embodiments, the distal end portion of the tongue component may have, for example, exterior dimensions corresponding to interior dimensions of the card entry slot extending the predetermined distance of the card entry slot into which said distal end portion is insertable. In further embodiments, the electrical contact may include, for example, a positive connector and a negative connector disposed on the distal end portion of the tongue component. In still other embodiments, the electrical contact may include, for example, a positive connector and a negative connector of a chip embedded in the distal end portion of the tongue component.

In further embodiments of the invention, the signal component may be activated in response to receiving the electric current by the signal component from the electrical contact of the interface of the card reader, which includes, for example, a positive connector and a negative connector of the interface of the card reader, via the electrical contact disposed on the distal end portion of the tongue component when the distal end portion of the tongue component is inserted the predetermined distance into said card entry slot. In still further embodiments, the signal component may include, for example, a light emitting signal coupled to the electrical contact disposed on the distal end portion of the tongue component and activated in response to receiving the electric current by the signal component via the electrical contact disposed on the distal end portion of the tongue component when the distal end portion of the tongue component is inserted the predetermined distance into said card entry slot.

In additional embodiments of the invention, the signal component may include, for example, a light emitting diode signal coupled to the electrical contact disposed on the distal end portion of the tongue component and activated in response to receiving the electric current by the signal component via the electrical contact disposed on the distal end portion of the tongue component when the distal end portion of the tongue component is inserted the predetermined distance into said card entry slot. In other embodiments, the signal component may include, for example, a sound emitting signal coupled to the electrical contact disposed on the distal end portion of the tongue component and activated in response to receiving the electric current by the signal component via the electrical contact disposed on the distal end portion of the tongue component when the distal end portion of the tongue component is inserted the predetermined distance into the card entry slot.

Other embodiments of the invention may include, for example, an overlay component supporting a proximal end portion of the tongue component. In further embodiments, the signal component coupled to the electrical contact disposed on the distal end portion of the tongue component may be affixed to the overlay component. In additional embodiments, the overlay component may have portions defining a surface topography corresponding to a surface topography of portions of a bezel area of the card entry slot of the card reader in which the distal end portion of the tongue component is insertable. In further embodiments, the signal component coupled to the electrical contact disposed on the distal end portion of the tongue component may be activated in response to receiving an electric current by the signal component via the electrical contact disposed on the distal end portion of the tongue component when all portions defining the surface topography of the overlay component are in direct face-to-face contact with the corresponding surface topography portions of the bezel area of the card entry slot.

A method for embodiments of the invention may involve, for example, providing a tongue component having a distal end portion insertable a predetermined distance into a card entry slot of a card reader; providing the tongue component with an electrical contact disposed on the distal end portion of the tongue component; providing a signal component coupled to the electrical contact; and activating the signal component in response to receiving an electric current by the signal component via the electrical contact disposed on the distal end portion of the tongue component when the distal end portion of the tongue component is inserted the predetermined distance into the card entry slot. Other embodiments may involve, for example, providing an overlay component supporting a proximal end portion of the tongue component. Additional embodiments may involve, for example, affixing the signal component to the overlay component.

In additional embodiments of the invention, providing the overlay component may involve, for example, providing the overlay component with portions defining a surface topography corresponding to a surface topography of portions of a bezel area of the card entry slot of the card reader into which the distal end portion of the tongue component is insertable. In further embodiments, activating the signal component may involve, for example, activating the signal component in response to receiving an electric current by the signal component via the electrical contact disposed on the distal end portion of the tongue component when all portions defining the surface topography of the overlay component are in direct face-to-face contact with the corresponding surface topography of the portions of the bezel area of the card entry slot.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 3A is a schematic top plan view of a card reader chip interface with the example detection device for embodiments of the invention before insertion into the card reader entry slot;

FIG. 3B is a schematic top plan view of the card reader chip interface of FIG. 3A with a foreign object impeding insertion of the example detection device for embodiments of the invention; and FIG. 3C is a schematic top plan view of the card reader chip interface of FIGS. 3A and 3B with no foreign object impeding insertion of the example detection device for embodiments of the invention.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide a detection device designed for various types of card readers, such as ATM, POS and access control card readers, to ensure that authorized personnel are able to conduct accurate and efficient inspections for various types of card shimmers and card skimmers. For example, embodiments of the invent may provide such a device that is engineered to slide into a card reader and to occupy all of the available space within the card reader only if no foreign devices have been placed on top of or inside the card reader entry slot or on top of the card slot bezel area of the card reader entry slot. The inability of such a device to slide into the card reader indicates the presence of such a foreign device inside or on top of the card reader entry slot or on the bezel area of the card reader entry slot.

Figure 1A:
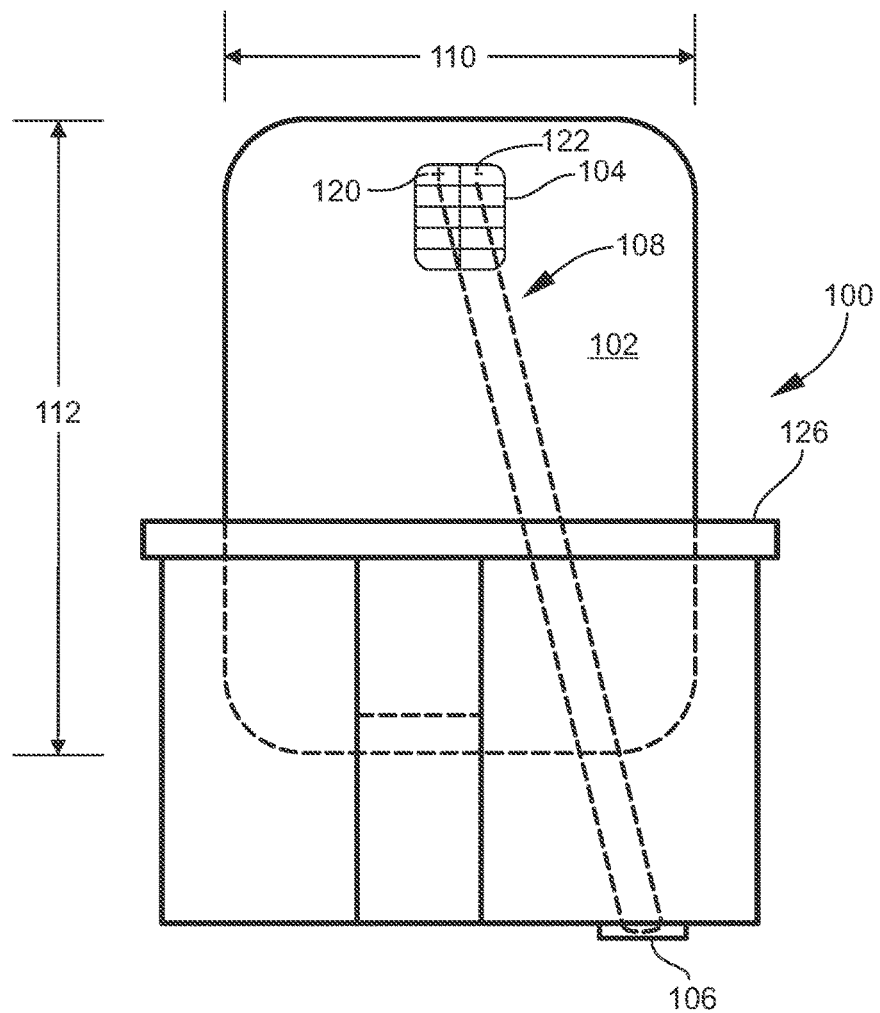
FIG. 1A is a schematic top plan view of an example of an inspection device for embodiments of the invention.
Figure 1B:
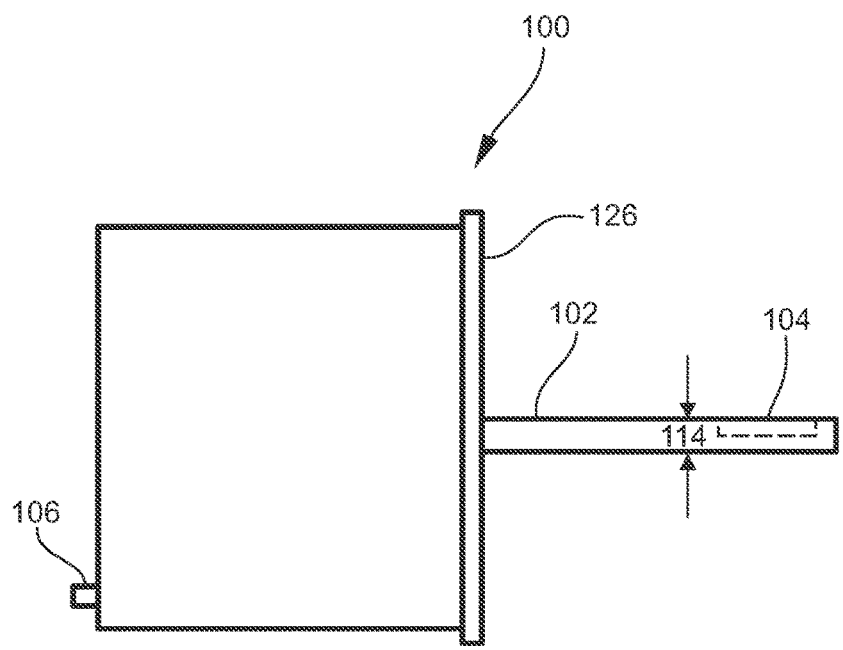
FIG. 1B is a schematic side elevational view of the example inspection device of FIG. 1A for embodiments of the invention.
Figure 1C:
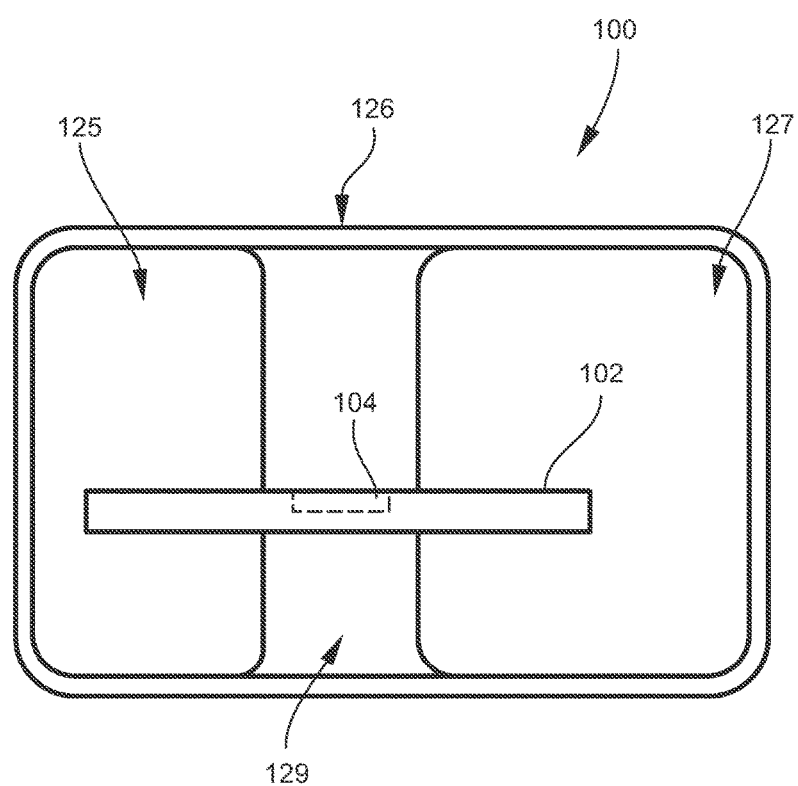
FIG. 1C is a schematic front elevational view of the example inspection device of FIGS. 1A and 1B for embodiments of the invention and FIG. 2 is a front perspective view of an example of a bezel area of a card reader entry slot of an ATM model for which the inspection device for embodiments of the invention may be configured.
Figure 2:
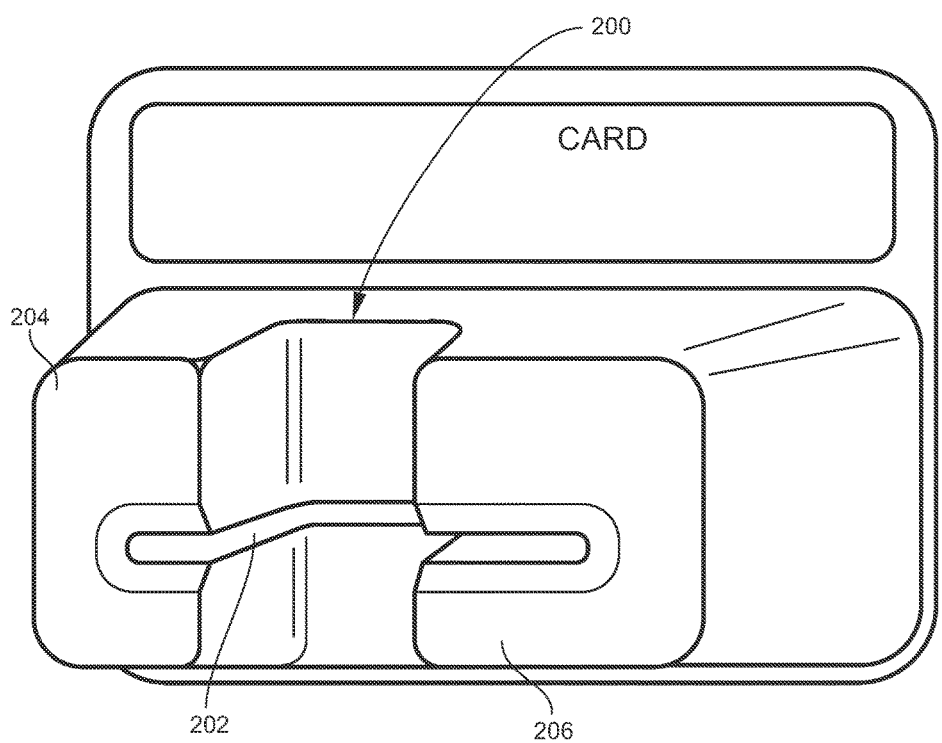

FIGS. 1A, 1B, and 1C show schematic top plan, side elevational, and front elevational views, respectively, of an example of a device 100 for embodiments of the invention. It is to be understood that the example device for embodiments of the invention described and depicted herein may be configured for use with a particular commercially available ATM model. FIG. 2 is a front perspective view of an example of a bezel area 200 of a card reader entry slot 202 of a commercially available ATM model for which embodiments of the invention may be configured. It is to be further understood, that the card reader entry slot 202 and surrounding bezel area 200 depicted in FIG. 2 are examples only and that embodiments of the invention may be configured for use with any device that employs a card reader, such as any other ATM model, any type of POS terminal, and any type of access control device.

Referring to FIGS. 1A, 1B, and 1C, an inspection device 100 for embodiments of the invention may detect a shimming device that has been inserted into a card reader slot, such as card reader entry slot 202 depicted in FIG. 2. Current ATM card shimming threats have certain aspects in common with one another. For example, each shimming device is designed to capture card data stored on a card track, and all of such devices occupy space on or within a particular terminal, such as an ATM. Such device 100 for embodiments of the invention may ensure, for example, that there is not a card trap, such as a card-shimming device, inside the card reader slot 202 that can read a card chip.

Referring further to FIGS. 1A, 1B, and 1C, the inspection device 100 for embodiments of the invention may have, for example, a tongue component 102 that may be embedded with a chip 104. The inspection device 100 for embodiments may comprise the tongue component 102 that may be inserted into the card entry slot 202 of a card reader. The tongue component 102 may enable a user to detect whether or not there is a foreign object is inside the slot 202 of the card reader and also to confirm continuity between the card reader and a signal, such as an LED signal 106 shown in FIGS. 1A and 1B.

Referring to FIGS. 1A, 1B, 1C, and FIG. 2, the device 100 may be configured to be fully inserted into an ATM card entry slot 202 during an inspection, leading with the chip-equipped tongue component 102. If no fraud devices are encountered during such insertion, the device 100 may activate a signal, such as the LED signal 106, confirming that no obstruction exists on or inside the card reader slot 202. Referring to FIG. 1A, in embodiments of the invention, the signal, such as the LED signal 106 may be connected, for example, via electrical connection 108 to the chip 104 embedded in the tongue component 102, and may illuminate when contact is made between the embedded chip 104 with a chip reader interface of a card reader within the card reader slot 202 only if no obstruction exists internally or externally of the card reader slot 202.

FIG. 3A shows a schematic top plan view of a card reader chip interface 300 inside an ATM with the detection device 100 for embodiments of the invention before insertion of the device into the card reader slot 202; FIG. 3B shows a schematic top plan view of the card reader chip interface 300 of FIG. 3A with a foreign object impeding insertion of the detection device 100, and Fig. C shows a schematic top plan view of the card reader chip interface 300 of FIGS. 3A and 3B with no foreign object impeding insertion of the detection device 100. Referring to FIGS. 3A, 3B, and 3C, in embodiments of the invention, the chip-enabled tongue component 102 may be inserted into a card reader slot, such as card reader slot 202 depicted in FIG. 2, to ensure that no obstructions exist, such as shimmers, deep insert skimmers, card traps, or throat inlay skimmers.

Referring to FIG. 3C, when the chip-enabled tongue component 102 is fully inserted with no foreign objects impeding its insertion, power may be supplied to the chip 104 embedded in the tongue component 102 via contacts 302 and 304 of the card reader interface 300. When fully inserted, the embedded chip 104 may serve as a power conduit from the card reader interface contacts 302, 304 via electrical connection 108 to the signal, such as LED signal 106. Optionally, in embodiments of the invention, the embedded chip 104 may also serve as a power conduit from the card reader interface contacts 302, 304 to audit controls to ensure, for example, that the inspection is being conducted by use of ATM logs or ATC on the device 100 itself. In embodiments of the invention, the embedded chip 104 of the tongue component 102 of the device 100 may be programmed with unique data for each deployment.

Referring to FIGS. 1A and 1B, a width 110, depth 112, and thickness 114 of the chip-enabled tongue component 102 may be dimensioned to occupy all available space within the card reader slot 202, ensuring that thin shimmers are not hidden inside the card reader housing. Thus, the width 110, depth 112, and thickness 114 of the chip-enabled tongue component 102 may vary according to exact dimensions of the interior of the card reader slot 202. For example, the tongue component 102 may have a width 110, depth 112, and thickness 114 equal to, or approximately equal to, international standards that may be prescribed for credit cards, such as a width of 2⅛ inches, a depth of 3⅜ inches, and a thickness of 1/32 inch. However, it is to be understood that the width 110, depth 112, and thickness 114 of the chip-enabled tongue component 102 may vary according to the exact dimensions of the interior of the card reader entry slot 202 and/or particular specifications of an exterior contour or surface topography of the bezel area 200 of the card reader entry slot.

As noted, to ensure that a shimming device has not been placed on the chip reader interface 300 depicted in FIGS. 3A, 3B, and 3C within the card entry slot 202 depicted on FIG. 2, embodiments of the invention also involve, for example, the chip-enabled tongue component 102 of the device 100 depicted in FIGS. 1A, 1B and 1C. Chip cards do not have an onboard power supply and must rely instead on power supplied by the card reader interface in order to function. Thus, chip cards require direct electrical contact between contact points on the chip of a chip-equipped card and the card reader interface, such as contact points 302 and 304 of card interface 300 shown in FIGS. 3A, 3B, and 3C. Such contact may be made between the card reader interface 300 and contact points on a contact plate of a chip-equipped card when the card is inserted into the card entry slot 202 to complete a circuit. When this contact is made, the card reader delivers a small amount of electric power to the chip on the chip-equipped card in order to start a session in which the chip-enabled card and the card reader communicate with one another.

The device for embodiments of the invention makes use of the low voltage power that is normally delivered to the chip on a chip-equipped card when contact is made between the card reader and the chip of a chip-equipped card. Thus, if the tongue component 102 of the device 100 for embodiments of the invention is able to slide all the way into a card entry slot, such as ATM card entry slot 202, contacts 120, 122 on the tongue component 102 may meet the contacts 302, 304 of the card reader interface 300. When contacts 120, 122 on the tongue component 102 meet the contacts 302, 304 of the card reader interface 300, low voltage electric power is provided by the card reader interface 300 to the device 100 for embodiments of the invention, which in turn may cause illumination of a signal, such as LED signal 106, that may be disposed, for example, on another component of the device 100, such as an overlay component 126 of the device. The illumination of the LED signal component 106 may indicate that nothing is present in the card entry slot 201, such as a shimming device, to prevent power from flowing between the card reader interface 300 and a chip card.

The detection device 100 for embodiments of the invention may employ integrated circuits that emulate integrated circuits embedded in chip cards. Thus, the detection device 100 may be provided with a connector 104 similar to the connector of a chip card. For example, a typical chip card may have an 8-pin connector, only two of which pins may be involved in receiving electric power from the card reader interface 300. Referring to FIG. 3C, when pin 130 of the detection device 100 is aligned, for example, with the positive pole 302 of the card reader interface 300 and pin 132 of the detection device 100 is aligned with the ground pole 304 of the card reader interface 300, pins 130 and 132 may be connected to the LED signal 106 that illuminates to confirm the alignment. Thus, a user may be assured that the detection device 100 is fully inserted, as depicted in FIG. 3C, and that there are no foreign objects impeding insertion of the device.

Another aspect of embodiments of the invention may also allow, for example, branch personnel to perform more efficient inspections of the fascia of an ATM to ensure that there are no signs of tampering, PIN pad overlay devices, or hidden camera panels present on the ATM. For example, referring to FIGS. 1C and 2, overlay component 126 of the device 100 may have portions spaced apart by an area 129, within which spaced apart portions are defined recessed interior areas 125 and 127 that are contoured to fit snugly over respective corresponding projections 204 and 206 of bezel area 200 of an existing ATM card reader entry slot 202, ensuring no external skimming devices exist.

Thus, an inspection device for embodiments of the invention may also ensure that there is not a card entry slot skimming device within the card reader slot 202 which can read a magnetic stripe on a magnetic stripe card and/or that there is not an overlay skimming device on top of the card reader entry slot 202 that can also read the magnetic stripe information on such a card. Thus, the device 100 for embodiments may include, for example, the overlay component 126 engineered with a surface topography that is contoured with exact dimensions conforming to the dimensions of an exterior surface topography of bezel area 200. For example, for the bezel area 200 depicted in FIG. 2 with projections 204 and 206, the overlay component 126 of the device 100 may have spaced apart portions within which corresponding recesses 125 and 127 are defined with respective interior surface topographies that are contoured with dimensions conforming to the dimensions of aft exterior surface topographies of projections 204 and 206. In addition, tongue component 102 of the device 100 may also have exterior surface topography contours conforming to the interior surface topography contours of the card reader entry slot 202.

If a user of a device 100 for embodiments of the invention is unable to slide the device completely into the card reader entry slot 202, such user would know that an object has been placed either on top of the bezel area 200 of the card reader entry slot or inside the card reader entry slot and may initiate appropriate remediation procedures. As noted, in embodiments of the invention, the overlay component 126 of the device 100 may be contoured with surface topographies that conform to the bezel area 200 of the card entry slot 202 of an ATM. Thus, if a user is able to slide the tongue component 102 of the device 100 into the card entry slot 202 with the overlay component 126 snugly abutting the exterior surface of the bezel area 200 of the ATM card entry slot 202, the user may be assured that no foreign device has been placed on the bezel area of the ATM card entry slot.

It is to be understood that the overlay component 126 may be engineered to conform to specifications for bezel arrears of various commercially available card reader entry slots as if directly molded to the exterior of such card readers and that embodiments of the invention are not limited to example overlay components, card entry slot bezel areas and card entry slots depicted herein. It is also to be understood that such specifications may vary from one manufacturer to another and that consequently, the overlay component 126 of the device for embodiments of the invention may likewise vary according to the particular manufacturer's specifications. It is to be further understood that tolerances for the configuration of the overlay component 126 for embodiments of the invention are minimal, because skimming devices that may be applied by criminals to card reader entry slots and bezel areas may be as thin as 2 millimeters or less. If the overlay component 126 of the detection device 100 does not fit very snugly over the card entry slot bezel area of an existing card reader, the user is aware that an external skimming device may have been placed over the entry slot bezel area 200.

What is claimed is:

1. A tamper detection device comprising:
a tongue component of the tamper detection device having a distal end portion insertable a predetermined unimpeded distance into a card entry slot of a card reader;
said tongue component having an electrical contact comprising a connector that emulates a connector similar to a connector of a chip card disposed on said distal end portion of the tongue component; and
a signal component of the tamper detection device coupled to said electrical contact activated in response to receiving an electric current by said signal component via said electrical contact disposed on said distal end portion of the tongue component only when said distal end portion of the tongue component is inserted the predetermined unimpeded distance into said card entry slot.

2. The device of claim 1, said tongue component having a distal end portion insertable the predetermined unimpeded distance into the card entry slot of a chip card reader.

3. The device of claim 1, said distal end portion of the tongue component having exterior dimensions corresponding to interior dimensions of the card entry slot extending the predetermined unimpeded distance of the card entry slot into which said distal end portion is insertable.

4. The device of claim 1, wherein said electrical contact comprises a positive connector and a negative connector disposed on said distal end portion of the tongue component.

5. The device of claim 1, wherein said electrical contact comprises a positive connector and a negative connector of a chip embedded in said distal end portion of the tongue component.

6. The device of claim 1, wherein said signal component is activated in response to receiving the electric current by the signal component from an electrical contact of an interface of the card reader via said electrical contact disposed on said distal end portion of the tongue component only when said distal end portion of the tongue component is inserted the predetermined unimpeded distance into said card entry slot.

7. The device of claim 6, wherein said signal component is activated in response to receiving the electric current by the signal component from the electrical contact of the interface of the card reader comprising a positive connector and a negative connector of the interface of the card reader via said electrical contact disposed on said distal end portion of the tongue component only when said distal end portion of the tongue component is inserted the predetermined unimpeded distance into said card entry slot.

8. The device of claim 1, said signal component comprising a light emitting signal coupled to said electrical contact disposed on said distal end portion of the tongue component and activated in response to receiving the electric current by said signal component via said electrical contact disposed on said distal end portion of the tongue component only when said distal end portion of the tongue component is inserted the predetermined unimpeded distance into said card entry slot.

9. The device of claim 8, said signal component comprising a light emitting diode signal coupled to said electrical contact disposed on said distal end portion of the tongue component and activated in response to receiving the electric current by said signal component via said electrical contact disposed on said distal end portion of the tongue component only when said distal end portion of the tongue component is inserted the predetermined unimpeded distance into said card entry slot.

10. The device of claim 1, said signal component comprising a sound emitting signal coupled to said electrical contact disposed on said distal end portion of the tongue component and activated in response to receiving the electric current by said signal component via said electrical contact disposed on said distal end portion of the tongue component only when said distal end portion of the tongue component is inserted the predetermined unimpeded distance into said card entry slot.

11. The device of claim 1, further comprising, an overlay component supporting a proximal end portion of said tongue component.

12. The device of claim 11, wherein said signal component coupled to said electrical contact electrical contact disposed on said distal end portion of the tongue component is affixed to said overlay component.

13. The device of claim 11, said overlay component having portions defining a surface topography corresponding to a surface topography of portions of a bezel area of the card entry slot of the card reader in which the distal end portion of said tongue component is insertable.

14. The device of claim 13, wherein said signal component coupled to said electrical contact disposed on said distal end portion of the tongue component is activated responsive to receiving an electric current by said signal component via said electrical contact disposed on said distal end portion of the tongue component only when all portions defining said surface topography of the overlay component are in direct face-to-face contact with the corresponding surface topography of said portions of the bezel area of the card entry slot.

15. A tamper detection method comprising:
providing a tongue component of a tamper detection device having a distal end portion insertable a predetermined unimpeded distance into a card entry slot of a card reader;
providing said tongue component with an electrical contact comprising a connector that emulates a connector similar to a connector of a chip card disposed on said distal end portion of the tongue component;
providing a signal component of the tamper detection device coupled to said electrical contact; and
activating said signal component of the tamper detection device in response to receiving an electric current by said signal component via said electrical contact disposed on said distal end portion of the tongue component only when said distal end portion of the tongue component is inserted the predetermined unimpeded distance into said card entry slot.

16. The method of claim 15, further comprising, providing an overlay component supporting a proximal end portion of said tongue component.

17. The method of claim 16, wherein providing said signal component coupled to said electrical contact further comprises affixing said signal component to said overlay component.

18. The method of claim 16, wherein providing said overlay component further comprises providing said overlay component having portions defining a surface topography corresponding to a surface topography of portions of a bezel area of the card entry slot of the card reader into which the distal end portion of said tongue component is insertable.

19. The method of claim 18, wherein providing activating said signal component further comprises activating said signal component in response to receiving an electric current by said signal component via said electrical contact disposed on said distal end portion of the tongue component only when all portions defining said surface topography of the overlay component are in direct face-to-face contact with the corresponding surface topography of said portions of the bezel area of the card entry slot of the card reader into which the distal end portion of said tongue component is insertable.

* * * * *